Sept. 18, 1951     C. H. JACOBSON     2,568,339
FILM ADVANCING MEANS FOR FILM MAGAZINES
Filed Nov. 29, 1946
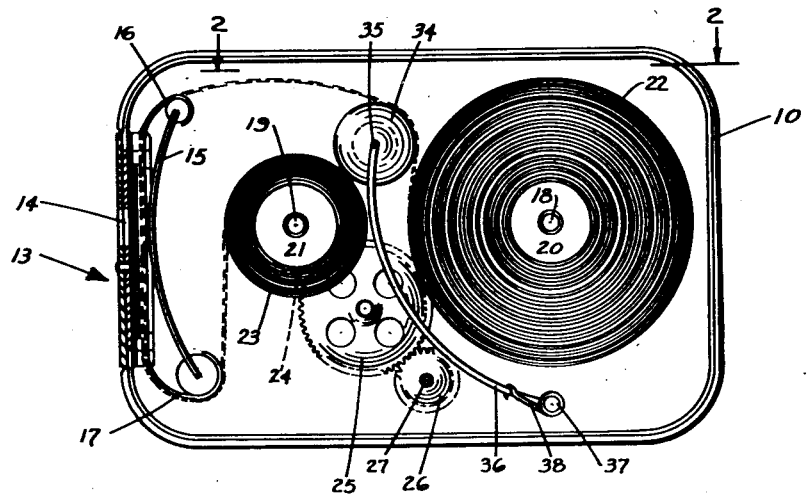
FIG. 1
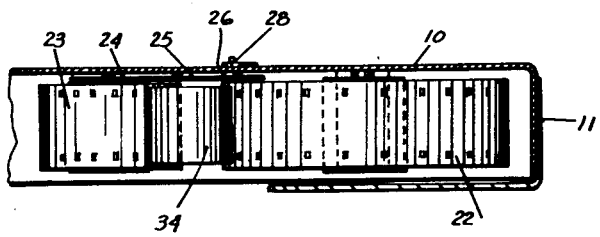
FIG. 2
FIG. 3     FIG. 4
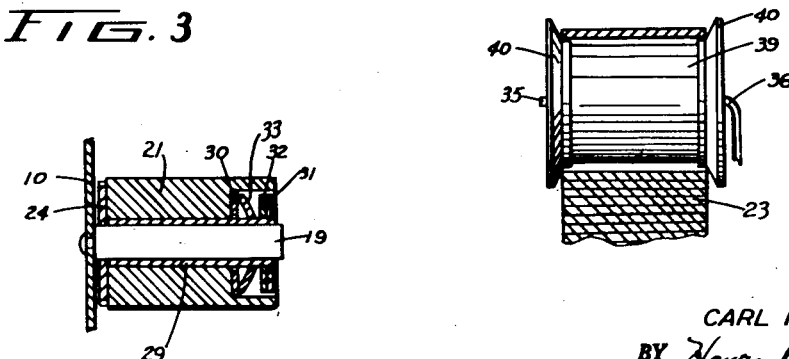
INVENTOR.
CARL H. JACOBSON
ATTORNEYS Patented Sept. 18, 1951

2,568,339

UNITED STATES PATENT OFFICE 2,568,339

FILM ADVANCING MEANS FOR FILM MAGAZINES

Carl H. Jacobson, Binghamton, N. Y., assignor to General Aniline & Film Corporation, New York, N. Y., a corporation of Delaware Application November 29, 1946, Serial No. 713,159

4 Claims. (Cl. 88—17)

This application pertains to an invention in magazines for motion picture cameras, and more especially to a magazine of the sprocketless type in which the film is positively taken up after passing through a film gate but where it is drawn through the gate and from a supply reel by the usual claw or pull-down member.

Among the objects of the invention is that of providing in a magazine for motion picture cameras a means for assisting in drawing film from a supply reel in the magazine and advancing it toward the gate at which the usual claw serves to move the film a frame at a time and the requisite number of frames per second.

It is a further object to devise such means for assisting in the drawing off and advancing of the film toward the gate which shall act upon the film at the side thereof opposite the emulsion and which shall frictionally engage the film and advance it.

A further object of the invention is that of devising a film feeding means which, despite the fact that all driving force exerted on the film is of a frictional type (does not involve sprockets or other means for engaging the film perforations), will feed the film at a speed bearing a direct relation to the rate at which the film is to be taken up after it has passed through the gate.

It is a further object to devise such frictional driving means for acting upon the film that the actual tractive force exerted by said means shall not depend upon the size of either the supply or take-up reels of film, and shall be sufficient for the purpose of relieving undue tension on the film between the gate and supply.

The invention is applied to a magazine having among other parts, a casing which is substantially light tight, a gate in said casing at which each single frame of the film is exposed, or means at that end of the casing adjacent a gate in the camera itself, for permitting the film to be drawn from the magazine to enter that gate and to be returned to the magazine after exposure. If the gate is in the magazine itself, it also includes the usual presser members and guiding means over which the film is passed. In addition there are the take-up and supply reel supports on which are mounted the usual cores, one for the unexposed film or supply, and the other for exposed film and on which that film is to be wound after it has been passed through the gate during the making of a series of motion picture scenes.

According to one form the invention may take, a roller is provided and has a surface of such material that considerable friction will be developed between it and the surface of the film against which it bears and that which is also wrapped about it. This roller is resiliently urged in the direction of the take-up spool and has such radius of action that as the take-up reel grows in size, the said roller moves away from the center of the take-up spool, but always bears against the film thereon with substantially the correct, predetermined pressure. The said roller is preferably mounted at the end of an arm. That arm, pivoted at a considerable distance from the roller, is biased by a spring or other resilient means to effect the above-mentioned frictional engagement between the roller surface and film roll.

As the roller is positioned between the take-up and supply film rolls and slightly above the centers thereof, it is always in a position to have the film as it is drawn off the supply reel, wrapped about it for an angle of approximately 90°. That assures sufficient frictional or tractive engagement with the film so that it will be drawn from the supply and will serve to rotate the supply which, as is the usual practice, is slightly retarded in its movement so as to prevent overtravel. The action of the frictionally driven film advancing roller always results in substantially the same tractional force being applied to the film and, therefore, the spring tension applied to the arm or other means on which the roller is mounted may be carefully adjusted on assembly of the parts. The most effective pressure and maximum efficiency is realized throughout the exposure of the entire film roll. That is not true of those frictional driving means for the supply reel itself in which the supply reel rests upon and is driven by the take-up reel. Such a system is dependent upon the supply reel being mounted above or substantially above the take-up reel so as to take advantage of the force of gravity. The weight of the supply reel continuously changes so that the frictional driving force likewise varies from a maximum value at the start of exposing a magazine of film and is progressively reduced to something decidedly less before the film is entirely exposed. The contact between the roller and the film drawn from the supply, and between it and its film which has been wound on the take-up core, is always applied at the back (non-emulsion) side of the film so that no damage may result to the emulsion itself.

Now referring to the figures of drawing, in which like numerals refer to like parts, one embodiment of the invention will be described in greater detail. In the figures of drawing:

Fig. 1 shows a magazine to which the invention has been applied, the cover thereof being removed.

Fig. 2 is a sectional view taken at the line 2—2, Fig. 1.

Fig. 3 is a section showing details of a frictional drive for the take-up of the film.

Fig. 4 is a detail view of a modified feed roller.

Now referring to the figures, the magazine comprises, among other things, a casing of more or less rectangular shape and including a body part 10 and the usual cover 11 indicated in Fig. 2 and which has been removed from Fig. 1. A gate generally indicated by numeral 13 is so positioned at the front end of the casing 10 that it presents the film at an exposure aperture 14 in alignment with the lens and shutter of a camera, all as is the common practice. The gate also includes a spring 15 which serves to press a pressure plate against the film to maintain it in the proper focal plane. Curved elements 16 and 17 guide the film as it enters the gate and as it emerges therefrom and serve to prevent excessive bending of the film at either of these points.

Details of the gate structure will not be specifically described at this point since the invention is not dependent upon any particular type of gate and since, in fact, the magazine may be of that type in which the film is withdrawn at one side thereof to enter a gate which is a part of the camera itself rather than being an integral part of the magazine. In such construction the film is returned to the magazine after being exposed at the gate. An example of a magazine of this type is evident in United States Patent No. 2,106,374.

Supporting spindles 18 and 19 carry spools or cores 20 and 21 which serve to support or have wound thereon the supply roll of film 22 and the take-up reel 23, respectively. The spindle 18 and the core 20 are so constructed that the core is relatively free to rotate on the spindle, but is slightly frictioned or retarded to prevent overtravel or overrunning, such friction mechanisms being well known in the art, one of which is illustrated in United States Patent No. 1,953,985.

The spindle 19 supports the core 21 for free rotation thereon, although it is to be understood that the core 21 is driven through gearing including a gear 24 at the spool, and intermediate or idler gear 25 and a driving gear 26, the latter being fixed to a shaft which projects outwardly through the casing 10 to terminate in a clutch element 28. This clutch, when the mechanism is installed in the camera for which it is intended, is engaged by a cooperating element driven by a motor or other source of power in the camera itself.

The gear 24 positively driven at a predetermined speed by the mechanism above described imparts this rotation to the spool 21 through a frictional engaging means illustrated at Fig. 3.

While the invention is not limited to employment of any particular friction drive means for the take-up core, that herein illustrated includes a sleeve 29 fixed to the gear 24 and freely rotatable on spindle 19. The core 21 is freely rotatable on the sleeve 29 except for a frictional connection between the two which comprises a friction disk 30 fixed in a counterbored part of the core, a disk 31 fixed to the sleeve 29, a second friction disk 32 secured to disk 31 and a dished, resilient washer 33 which presses against both the friction disks 30 and 32. Rotation of gear 24 through the mechanism just described, imparts a driving force to the core 21 sufficient for purposes of taking up film as it is progressed through the gate. The normal speed of rotation for the core is as great as, and preferably slightly exceeds, the speed at which the film is to be received so that the core 21 will turn at the desired rate at the start of winding. As the film roll builds up on core 21, the amount of slip between the driving sleeve and the core 21 increases.

A roller 34 is pivoted on a spindle or shaft 35 fixed at the upper end of, or more preferably being an angularly bent portion of, the arm 36 by means of which the roller 34 is maintained in proper alignment with core 21 and is caused to move in an arc about a center 37. At the center or pivot 37 a coiled spring 38 serves to press or urge the arm 36 in a counter-clockwise direction and thus causes the roller 34 to bear against the film roll on core 24. Roller 34 may be fabricated from some light material such as molded plastic and has a rubber or other surface coating applied thereto such as will develop a maximum amount of friction against the surface of the film. Initial pressure is influenced by the spring and is as independent of the mass of the parts as is practicable. If the film between the supply and gate becomes taut, the effective frictional engagement and pressure increase thereby more positively to advance the film.

As the film 17 is withdrawn from the supply 22, it passes about roller 34 is progressing to the gate 13 and contacts that roller throughout an arc of substantially 90°. As the film roll 22 decreases in size and that at 23 builds up, the arm 36 permits the roller 34 to swing in a clockwise direction. Spring 38 which is, of course, passed in several turns about spindle 37, is so initially tensioned that the slight angular movement for the arm 36 does not appreciably increase the pressure between the surface of roller 34 and the film roll 23. The curvature of arm 36 and the size of roller 34 are so selected that as one film roll decreases in size and the other increases, there will be no contact of roll 24 with the supply 22, nor will there be any contact between the arm 36 and the film on either roll.

While the preferred form of the invention is that just above described, the friction roller 34 may, instead of swinging in an arc and being mounted at the end of an arm, such as arm 36, be so mounted as to move in a straight or other pathway not depending upon an arm which, to have the desired length, should pass downwardly between the two rolls of film.

Such a mechanism may involve a block or sliding element from which would project the spindle 35. A spring or other resilient means is then employed to urge the block and parts which it supports in a direction toward the take-up roll 23.

As the magazine is loaded, the supply roll 22 is inserted and the outer end of the film is then passed over the roller 34 which will naturally bear against the take-up core 21 at that time. The end of the film is threaded through the gate and down under guide 17 up to the core 21 at which it is attached by the usual C-clip or other temporary retaining means. The film may be formed into a slight loop between the roller 34 and guide 16 so that upon starting in the camera, the claw will have to draw only that film between roller 34 and the gate. As the take-up tends to maintain the film taut between the gate and the take-up core 21, it (the core) will be rotated so that the linear speed at which the film is actually progressed through the gate will likewise be the speed imparted to the surface of the film roll 23 and to the roller 34. Then the roller 34 by its frictional contact with the film will assist in advancing a like length of film from the supply to the gate.

In contrast to other frictional driving means, that herein described and claimed serves to impart to the film progressing to the gate, the same tractive effort and actually tends to measure off or meter out the same amount of film as is taken up at the take-up roll. Except for an almost imperceptible difference in spring tension as the roller 34 moves about the center 37 and as the take-up roll expands in size, the frictional contact between the roller 34 and the film on core 21 varies only with tension in the film between the supply and gate.

In the event more tractive effort than can be obtained with a covered roller is required, a roll modified as in Fig. 4 may be employed. A roller 39 is flanged or shrouded as at 40 and presents inner, inclined or conical surfaces to the film edges so that the film is easily centered or guided between them. The conical surfaces are spaced at their innermost parts adjacent the roller core a distance slightly less than the width of film to be handled.

Without employment of special surface materials with high coefficients of friction, the roller 39 will feed film with a high degree of tractive effort. The action assures greater tractive driving force as the tautness in the film from supply to gate increases. For different materials the angle of the conical faces may be changed.

In action, the claw draws film, its action being considerably faster than that of the take-up. The lag in take-up action gives a momentary loop at that side of the gate, but as the take-up roll is accelerated it rather quickly winds the film released at the gate as a result of the claw action. The rotation of the roll 23 turns roller 34 or 39 and that, in turn, draws a corresponding amount of film from supply 22 and advances it toward the gate.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. Film feed mechanism for magazines used in cameras, said magazines comprising a casing, a film supply roll and a film take-up roll therein, means for driving said take-up roll, a gate in said casing past which the film from said supply roll is wound on said take-up roll, a rotatable roller having a frictional surface thereon for engagement with the film drawn from the supply roll and wrapped about a portion of said roller prior to passing through said gate, an arm pivoted to a spindle affixed to said magazine and having at one end an angular projection about which said roller is free to rotate, and spring means for urging said arm in a direction to press the frictional surface of said roller into engagement with the film on said take-up roll, to be driven thereby, said arm being curved to avoid contact with the film on the supply and take-up rolls and being of such length as to move in an arc to and from the take-up roll and out of contact with the film on the supply roll.

2. Film feed mechanism for magazines used in cameras, said magazines comprising a casing, a film supply roll and a film take-up roll therein, means for driving said take-up roll, a spindle for each said rolls attached to said casing, a gate in said casing past which the film from said supply roll is wound on said take-up roll, film feed means for frictionally engaging and for drawing film from the supply roll and advancing it toward said gate including a pivot attached to said casing, an arm hinged to and adapted to be swung about said pivot, a roller having an axis parallel to the said spindle about which said take-up roll is rotated having a surface adapted to engage the film as it is wound on said take-up roll, said roller deriving a rotative movement therefrom and imparting that movement to the film drawn from the supply by exerting a tractive force thereon, and a spring resiliently urging said arm in a direction for pressing the surface of said roller against the film at said take-up roll.

3. Film feed mechanism for magazines used in cameras said magazines comprising a casing, a film supply roll and a film take-up roll therein, means for driving said take-up roll, a gate in said casing past which the film from said supply roll is wound on said take-up roll, a feed roller for said film between said supply roll and said gate frictionally engaging the film emerging from said supply roll, said roller being oriented for movement towards said supply roll and away from said take-up roll as the film is wound thereon, means for resiliently supporting said roller in frictional engagement with the film on said take-up roll whereby said roller is actuated by the rotation of said take-up roll and by the movement of the film.

4. Film feed mechanism for magazines used in cameras said magazines comprising a casing, a film supply roll and a film take-up roll therein, means for driving said take-up roll, a gate in said casing past which the film from said supply roll is wound on said take-up roll, a feed roller between said supply roll and said gate having its axis parallel with the axes of said rolls, the film being wound around said roller as it leaves said supply roll, said roller being oriented for movement towards said supply roll and away from said take-up roll as the film is wound thereon, means for resiliently supporting said roller in frictional engagement with the film on said take-up roll whereby said roller is actuated by the rotation of said take-up roll and by the movement of said film.

CARL H. JACOBSON.

REFERENCES CITED

The following references are of record in the file of this patent:

UNITED STATES PATENTS

| Number | Name | Date |
| --- | --- | --- |
| 2,161,341 | Fairbanks | June 6, 1939 |
| 2,304,971 | Tuttle et al. | Dec. 15, 1942 |
| 2,374,038 | Ress | Apr. 17, 1945 |
| 2,379,690 | Cunningham | July 3, 1945 |
| 2,384,637 | Owens | Sept. 11, 1945 |